United States Patent
Vukojicic (10) Patent No.: US 9,644,731 B2
(45) Date of Patent: May 9, 2017

(54) ONE-PIECE INERTIA RING FOR A HARMONIC DAMPER

(71) Applicant: Magna Powertrain, Inc., Concord (CA)

(72) Inventor: Dejan Vukojicic, Richmond Hills (CA)

(73) Assignee: MAGNA POWERTRAIN, INC., Concord (CA)

( * ) Notice: Subject to any disclaimer, the term of this patent is extended or adjusted under 35 U.S.C. 154(b) by 0 days.

(21) Appl. No.: 15/053,438

(22) Filed: Feb. 25, 2016

(65) Prior Publication Data

US 2016/0169362 A1  Jun. 16, 2016

Related U.S. Application Data

(63) Continuation of application No. 14/204,148, filed on Mar. 11, 2014, now Pat. No. 9,273,773.

(60) Provisional application No. 61/787,537, filed on Mar. 15, 2013.

(51) Int. Cl.
| | |
|---|---|
| *F16H 55/36* | (2006.01) |
| *F16D 3/00* | (2006.01) |
| *F16H 55/14* | (2006.01) |
| *F16F 15/12* | (2006.01) |

(52) U.S. Cl.
CPC ......... *F16H 55/36* (2013.01); *F16F 15/1203* (2013.01); *F16H 2055/366* (2013.01)

(58) Field of Classification Search
CPC .. F16H 2055/366; F16H 55/36; F16F 15/126; F16F 15/1442; Y10T 74/2131

USPC .................................................. 474/94, 166
See application file for complete search history.

(56) References Cited

U.S. PATENT DOCUMENTS

| | | | | |
|---|---|---|---|---|
| 2,473,335 A | * | 6/1949 | Hardy ................ | F16F 15/1442 29/463 |
| 2,784,016 A | * | 3/1957 | Heimbuch .......... | F04D 29/126 277/372 |
| 2,827,225 A | * | 3/1958 | Killian ................ | F16H 55/44 29/892.11 |
| 2,882,747 A | * | 4/1959 | Haushalter .......... | F16F 15/1442 188/264 R |
| 3,371,549 A | * | 3/1968 | Schrempp ........... | F16H 55/14 474/161 |
| 3,994,181 A | * | 11/1976 | Sproul ................. | F16H 55/44 29/892.3 |
| 4,220,056 A | * | 9/1980 | Bremer, Jr. .......... | F16F 15/1442 74/574.4 |
| 4,378,865 A | * | 4/1983 | McLean .............. | F16F 15/1442 188/379 |
| 4,710,152 A | * | 12/1987 | Ichikawa ............. | F16F 15/126 474/166 |
| 4,882,944 A | * | 11/1989 | Vohl .................... | F16F 15/126 474/166 |

(Continued)

FOREIGN PATENT DOCUMENTS

| | | |
|---|---|---|
| CN | 201953952 U | 8/2011 |
| EP | 0101015 A1 | 2/1984 |

(Continued)

*Primary Examiner* — Henry Liu
(74) *Attorney, Agent, or Firm* — Dickinson Wright PLLC (57) ABSTRACT

A harmonic damper for use in vehicular accessory drive systems. The harmonic damper includes a one-piece inertia ring manufactured from a sheet metal blank using a cold forming process to define a series of interconnected folded ring sections.

20 Claims, 5 Drawing Sheets

(56) References Cited

U.S. PATENT DOCUMENTS

| | | | | |
|---|---|---|---|---|
| 5,140,868 A * | 8/1992 | Mizuno | F02B 75/06 | 474/166 |
| 5,308,289 A * | 5/1994 | Funahashi | F16F 15/126 | 188/379 |
| 5,425,287 A * | 6/1995 | Beattie | F16F 15/1442 | 464/180 |
| 5,441,456 A * | 8/1995 | Watanabe | B21D 53/261 | 29/892.11 |
| 5,449,322 A * | 9/1995 | Wagner | F16F 15/1442 | 464/90 |
| 5,453,056 A * | 9/1995 | Ullrich | F16F 15/1442 | 474/161 |
| 5,465,485 A * | 11/1995 | Miyake | F16F 15/126 | 29/892.11 |
| 5,540,626 A * | 7/1996 | Asai | F16F 15/124 | 474/178 |
| 5,562,544 A * | 10/1996 | Ochs | F16F 15/1442 | 464/89 |
| 5,591,093 A * | 1/1997 | Asai | F16D 3/76 | 474/902 |
| 5,611,416 A * | 3/1997 | Berger | F16D 35/005 | 192/104 F |
| 5,843,264 A * | 12/1998 | Mabuchi | F16F 1/44 | 156/219 |
| 5,931,051 A * | 8/1999 | Ott | F16F 15/1485 | 74/574.4 |
| 5,988,015 A * | 11/1999 | Riu | F16F 15/124 | 464/90 |
| 6,026,709 A * | 2/2000 | Depp | F16F 15/126 | 464/180 |
| 6,062,104 A * | 5/2000 | Allport | F16F 15/124 | 192/66.1 |
| 6,106,421 A * | 8/2000 | Graber | F16F 15/126 | 474/94 |
| 6,386,065 B1 * | 5/2002 | Hodjat | F16F 15/126 | 474/94 |
| 6,684,735 B2 * | 2/2004 | Watanabe | F16F 15/1203 | 428/450 |
| 6,875,113 B2 * | 4/2005 | Nichols | F16F 15/1442 | 464/90 |
| 7,047,644 B2 * | 5/2006 | Hodjat | F16F 15/126 | 29/892 |
| 7,055,243 B2 * | 6/2006 | Hodjat | B21D 53/261 | 29/892.11 |
| 7,150,679 B2 * | 12/2006 | Pape | F16F 15/126 | 464/17 |
| 7,178,423 B2 | 2/2007 | Breese et al. | | |
| 7,197,959 B2 * | 4/2007 | Crissy | F16F 15/126 | 464/90 |
| 7,204,772 B2 * | 4/2007 | Huber | F16D 3/68 | 474/94 |
| 7,300,372 B2 * | 11/2007 | Riu | F16F 15/126 | 464/90 |
| 7,437,808 B2 | 10/2008 | Hodjat | | |
| 7,850,557 B2 * | 12/2010 | Moriya | F16H 55/36 | 464/90 |
| 8,091,450 B2 | 1/2012 | Manzoor et al. | | |
| 8,162,762 B2 * | 4/2012 | Himmelmann | F16D 3/74 | 310/75 D |
| 8,202,183 B2 * | 6/2012 | Riu | F16D 41/203 | 474/70 |
| 8,231,488 B2 * | 7/2012 | Amati | H02K 7/1012 | 474/166 |
| 8,302,753 B2 | 11/2012 | Antchak et al. | | |
| 8,506,434 B2 * | 8/2013 | Harvey | F16D 47/02 | 192/41 R |
| 2003/0199348 A1 * | 10/2003 | Huber | F16D 3/68 | 474/94 |
| 2004/0166974 A1 * | 8/2004 | Hodjat | F16F 15/126 | 474/94 |
| 2004/0255719 A1 | 12/2004 | Schmidt | | |
| 2006/0030441 A1 * | 2/2006 | Watanabe | F16F 15/126 | 474/166 |
| 2006/0038333 A1 * | 2/2006 | Hwang | F16F 15/173 | 267/259 |
| 2006/0094547 A1 * | 5/2006 | Xu | F16F 15/126 | 474/94 |
| 2006/0172832 A1 * | 8/2006 | Watanabe | F16F 15/126 | 474/94 |
| 2006/0293137 A1 * | 12/2006 | Lopes | F16F 15/1442 | 474/166 |
| 2007/0249442 A1 * | 10/2007 | Grunau | F16F 15/1442 | 474/94 |
| 2008/0076611 A1 * | 3/2008 | Fisher | F02B 67/06 | 474/178 |
| 2009/0000422 A1 * | 1/2009 | Christenson | F16F 7/108 | 74/574.4 |
| 2009/0105021 A1 * | 4/2009 | Amati | H02K 7/1012 | 474/94 |
| 2010/0029422 A1 * | 2/2010 | Riu | F16D 3/14 | 474/94 |
| 2010/0099527 A1 * | 4/2010 | Rolando | F16F 15/1442 | 474/94 |
| 2012/0094791 A1 * | 4/2012 | Lee | F16F 15/126 | 474/94 |
| 2012/0186938 A1 * | 7/2012 | Harvey | F16D 47/02 | 192/41 S |
| 2012/0231909 A1 * | 9/2012 | Shin | F16F 15/126 | 474/94 |
| 2013/0095964 A1 * | 4/2013 | Shin | F16F 15/126 | 474/94 |
| 2015/0252885 A1 * | 9/2015 | Manzoor | F16H 55/36 | 474/148 |

FOREIGN PATENT DOCUMENTS

| | | |
|---|---|---|
| EP | 0620380 A1 | 10/1994 |
| EP | 1382886 A1 | 1/2004 |
| GB | 1534675 A | 12/1978 |
| WO | WO2010054935 A1 | 5/2010 |

\* cited by examiner

ONE-PIECE INERTIA RING FOR A HARMONIC DAMPER

CROSS REFERENCE TO RELATED APPLICATIONS

This application is a continuation of U.S. application Ser. No. 14/204,148 filed Mar. 11, 2014 which claims the benefit of U.S. Provisional Application No. 61/787,537 filed Mar. 15, 2013. The entire disclosure of each of the above applications is incorporated herein by reference.

FIELD

The present disclosure relates generally to formed components for use in automotive applications. More specifically, the present disclosure relates to harmonic dampers for use with internal combustion engine accessory drive systems and, in particular, to a one-piece inertia ring for use with harmonic dampers and a method of manufacturing the one-piece inertia ring using a forming process.

BACKGROUND

This section provides background information related to the present disclosure which is not necessarily prior art.

Virtually all motor vehicles equipped with internal combustion engines incorporate a "serpentine" drive belt system having a single endless drive belt and a series of pulleys. The pulleys derive rotary power from the endless drive belt and operate to drive various vehicle accessories such as, for example, the engine fan, the power steering pump, the water pump, the alternator and the air conditioning compressor. The endless drive belt that drives each of these accessory pulleys is, in turn, driven by an engine pulley that is connected to the crankshaft of the internal combustion engine. To reduce the transfer of vibrations and oscillations between the crankshaft and the serpentine drive belt system, the engine pulley, sometimes referred to as the "crankshaft pulley", may include a torsional vibration damper that functions to reduce the amplitude of the angular vibrations delivered by the crankshaft.

Integrated crankshaft pulley-torsional damper units, commonly referred to as "crankshaft dampers", may include a hub configured to be rigidly connected to the crankshaft, a driven member, and at least one ring of elastomeric material connecting the hub to the driven member. The elastomeric material functions to filter/absorb the torsional oscillations transferred to the hub from the crankshaft. In many instances, the hub includes an integral pulley and the driven member is an inertia ring. The elastomeric material is typically compressed between the pulley and the inertia ring to provide the requisite slip torque for absorbing the torsional vibration.

Automotive pulleys can be made by spinning sheet metal using a number of different processes known in the industry. However, crankshaft dampers typically must be stronger and more massive than ordinary sheet metal pulleys. Specifically, a greater mass is required to provide the requisite amount of inertia to absorb crankshaft vibration. As such, many pulleys and inertia rings associated with crankshaft dampers are made from forgings or castings. Unfortunately, the expense and time required to machine these components is prohibitive. As an alternative, some components of the crankshaft damper can be flow formed from sheet metal but can only be made up to a certain blank thickness in terms of economics and practicality.

In view of the above, there is a recognized need in the field of automotive harmonic dampers generally and crankshaft dampers specifically to manufacture components, such as inertia rings, using alternative manufacturing processes for reducing expense and providing high quality components.

SUMMARY

This section provides a general summary of the disclosure and is not intended to be a comprehensive disclosure of all of the features, aspects and objects of the inventive concepts to be described in detail hereinafter.

It is an aspect of the present disclosure to provide an improved inertia ring for use with a harmonic damper.

It is another aspect of the present disclosure to incorporate the inertia ring constructed in accordance with the present teaching into a crankshaft damper unit.

It is another aspect of the present disclosure to provide a method of manufacturing an inertia ring for a harmonic damper which results in material savings, reduced product cost and enhanced operational performance.

It is another aspect of the present disclosure to provide a method of cold forming an inertia ring for a harmonic damper from a blank to provide a one-piece component.

It is yet another aspect of the present disclosure to provide a harmonic damper having a cold-formed one-piece inertia ring, a pulley, and an elastomeric damper ring laminated between the pulley and the one-piece inertia ring.

It is yet another aspect of the present disclosure to provide a one-piece inertia ring for use in a harmonic damper having a multi-fold central mass body portion which terminates with a flange portion configured for attachment to the elastomeric damper ring.

In accordance with these and other aspects of the present disclosure, a harmonic damper is provided having an inertia ring that is manufactured via a sheet metal cold forming process. The inertia ring is preferably formed from a blank of low carbon sheet steel having a predetermined thickness. The blank is cold formed through a series of sequential metal forming stations to provide a "folded" inertia ring configuration. The folded or "accordion" type configuration permits a wide variety of inertia rings in terms of ring thickness, ring diameter and weight using the cold forming press and folding manufacturing process of the present disclosure.

Further areas of applicability will become apparent from the description provided herein. The description and specific examples in this summary are for purposes of illustration only and are not intended to limit the scope of the present disclosure.

DRAWINGS

The drawings described herein are for illustrative purposes only of selected embodiments and not all possible implementations such that they are not intended to limit the scope of the present disclosure. The following drawings include.

DETAILED DESCRIPTION

One or more exemplary embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The present disclosure is generally directed to mass or inertia components of the type well-suited for use in motor vehicle application. In particular, the present disclosure relates to harmonic damper units for use in automotive application. More specifically, a harmonic damper unit, hereinafter described as a crankshaft damper, is adapted to be installed on the crankshaft of an internal combustion engine for driving one or more vehicle accessories via accessory pulleys and an endless drive belt arrangement associated with an engine accessory drive system. To this end, the crankshaft damper is operable to absorb torsional vibrations transmitted by the crankshaft and is hereinafter disclosed as being integrated into an engine pulley assembly. More specifically, the engine pulley assembly is adapted to be rigidly secured to the crankshaft and is used with a V-belt that is wrapped around the outer periphery of the engine pulley assembly. The engine pulley assembly drives various accessories mounted within the vehicle which can include, for example, and alternator, a water pump, and air conditioning compressor, etc. by transmitting the rotary motive power of the crankshaft (produced by the engine) to the accessories via the V-belt.

Referring initially to FIGS. 1-5, an integrated engine pulley and harmonic damper, hereinafter referred to as crankshaft damper 10, constructed in accordance with the teachings of the present disclosure, is generally shown to include a pulley 12, an inertia ring 14 and an elastomeric ring 16 interconnecting inertia ring 14 to pulley 12. Pulley 12 may be formed to include a cup-shaped hub 18, a pulley rim 20 and a radial web plate 22 interconnecting hub 18 to pulley rim 20. Pulley 12 may be manufactured using any known method and, for example, may be manufactured as a hot rolled component made from a low carbon sheet steel or, in the alternative, may be manufactured as a cold formed component from a sheet metal blank using a suitable stamping process. A plurality of apertures 24 are formed in web plate 22 to reduce weight. Cup-shaped hub 18 may include a central mounting aperture 26 that is configured to receive a mechanical fastener, such as a bolt, for rigidly securing pulley 12 to an end of the crankshaft. Pulley rim 20 is generally cylindrical and is formed to include a plurality of V-shaped grooves 28 that are configured to engage the endless drive belt for transferring torque from the crankshaft to the other accessory pulleys for driving the vehicle's accessories.

Inertia ring 14 is a generally ring-shaped member having a central aperture 30 sized to surround an outer cylindrical surface 32 of hub 12. Inertia ring 14 is secured to hub 12 via a press-fit or a welded connection. Inertia ring 14 further includes an axially extending flange section 34 having an outer peripheral surface 36 that is radially offset relative to an inner peripheral surface 38 of pulley rim 20. As seen, elastomeric ring 16 is disposed between outer peripheral surface 36 of inertia ring 14 and inner peripheral surface 38 of pulley rim 20. Elastomeric ring 16 is pressed into the annular space between flange section 34 and pulley rim 20 and is partially compressed therebetween to resiliently interconnect inertia ring 14 for rotation with pulley 12. An intermediate portion of elastomeric ring 16 is disposed between an annular lip 40 formed on pulley rim 20 and an annular groove 42 formed in flange section 34 to assist in inhibiting axial sliding movement of elastomeric ring 16 relative to inertia ring 14 and pulley 12.

As noted, crankshaft damper 10 is an exemplary embodiment and is merely intended to identify the primary components typically associated with most harmonic dampers of the type used in automotive systems. To this end, the remainder of the present disclosure is directed to a unique construction of inertia ring 14 and a unique method of manufacturing inertial ring 14. More specifically, to a multi-step cold forming method is used to manufacture a "folded" or "accordion-type" inertia ring 14 of the present invention.

Figure 1:
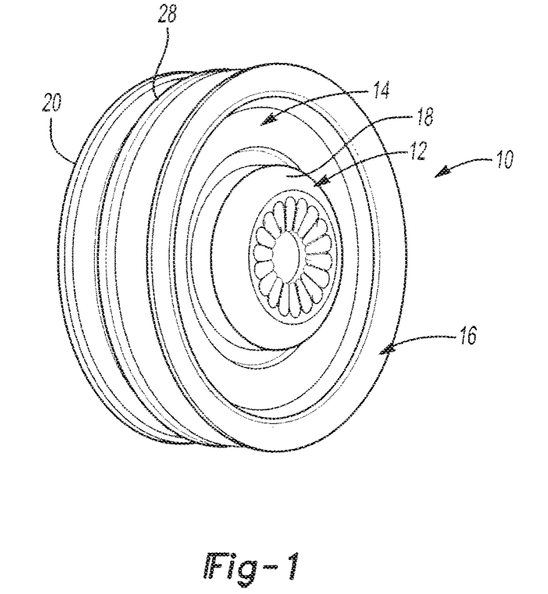
FIG. 1 is a perspective view of an exemplary embodiment of a harmonic damper unit constructed to include an inertia ring manufactured in accordance with the teachings of the present disclosure.
Figure 2:
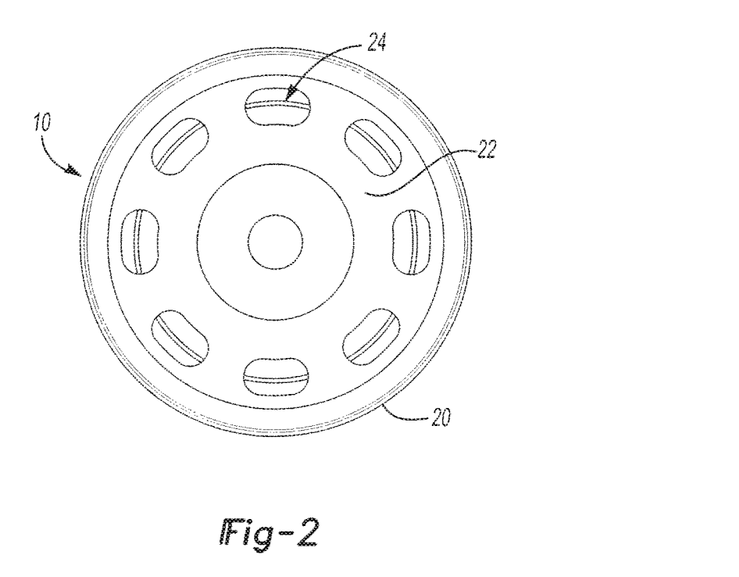
FIG. 2 is a first side view of the harmonic damper unit of FIG. 1.
Figures 3, 4:
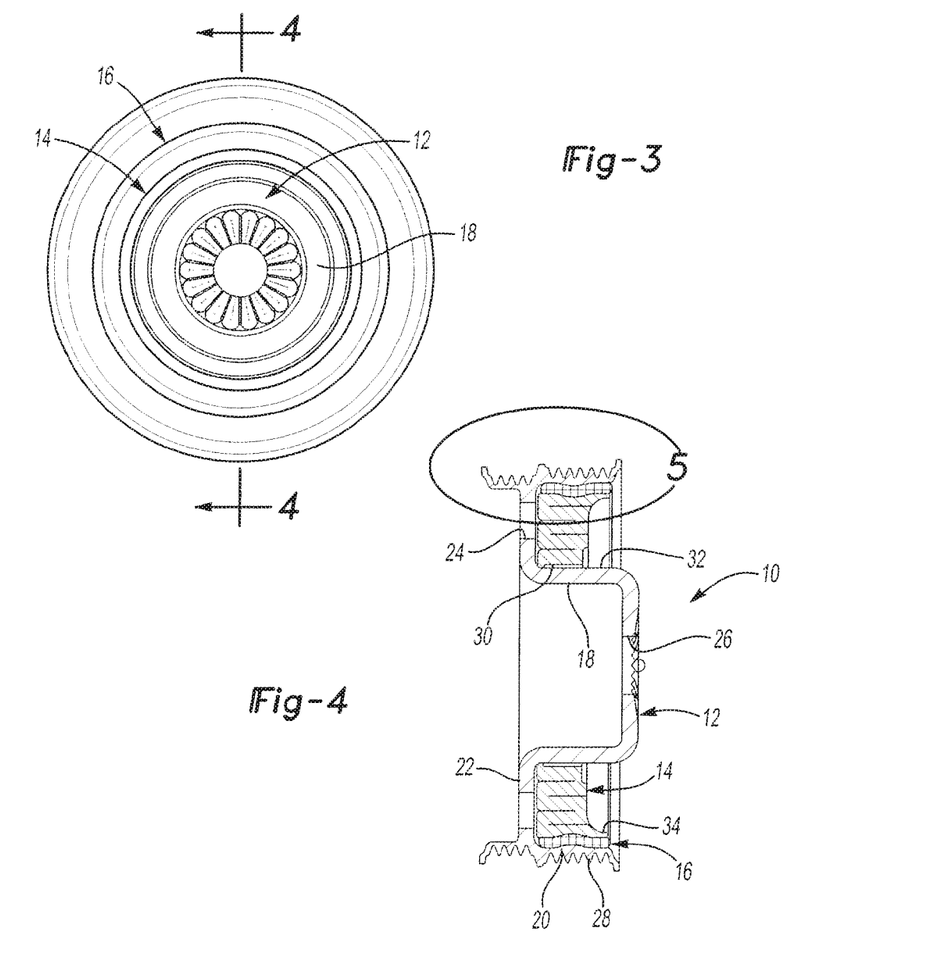
FIG. 3 is a second side view of the harmonic damper unit of FIG. 1.
FIG. 4 is a sectional view of the harmonic damper unit taken generally along line 4-4 of FIG. 3.
Figure 5:
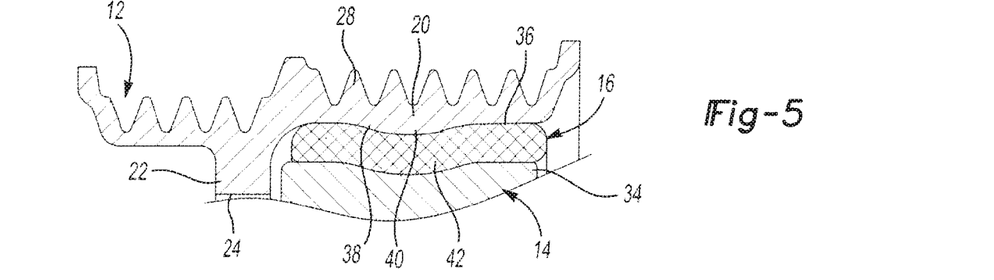
FIG. 5 is an enlarged partial view of the circled portion of FIG. 4.
Figure 6:
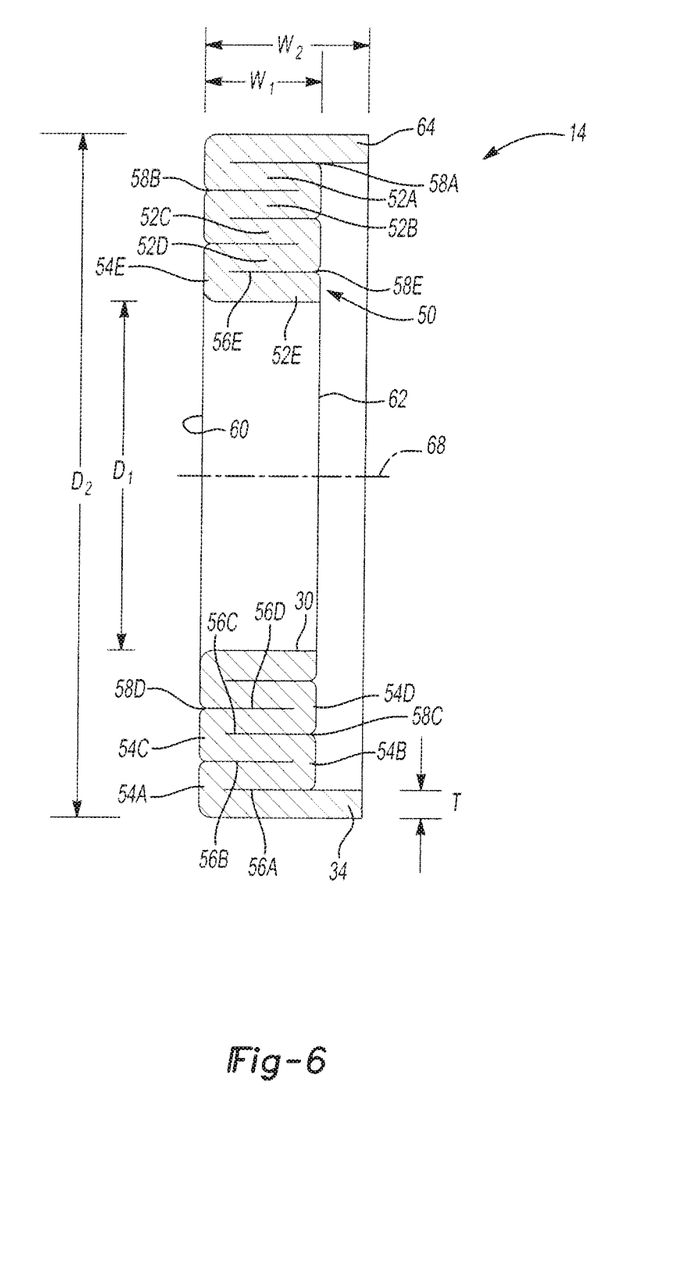
FIG. 6 is a sectional view of the inertia ring associated with the harmonic damper unit shown in FIGS. 1 through 5, and which embodies the teachings of the present disclosure.

Particular reference is drawn to FIG. 6 which shows a sectional view of an exemplary folded version of inertia ring 14 prior to its assembly into crankshaft damper 10 and which embodies the teachings of the present disclosure. Inertial ring 14 is shown to have a first or inner diameter dimension $D_1$, a second or outer diameter dimension $D_2$, a first width dimension $W_1$, and a second width dimension $W_2$. Inertia ring 14 is cold formed in a series of consecutive operations from a circular blank having a predetermined constant thickness T. Alternatively, a variable thickness blank may be used if desired to vary the mass of inertia ring 14 along its radial dimension.

In the particular example shown, a central mass or body portion 50 of inertia ring 14 is configured to be disposed between flange section 34 and central aperture 30 and is formed from a plurality of folded and stacked ring sections 52A, 52B, 52C, 52D, and 52E. Those skilled in the art will recognize that the number, width and length of such folded and stacked ring sections can be varied based on the desired mass and size of the inertia ring. Specifically, first ring section 52A is connected to flange section 34 via a first fold section 54A and both are pressed into engagement along a first axial interface 56A. Second ring section 52B is connected to first ring section 52A via a second fold section 54B and both are in pressed engagement along a second axial interface 56B. Third ring section 52C is connected to second ring section 52B via a third fold section 54C and both are in pressed engagement along a third axial interface 56C.

Fourth ring section 52D is connected to third ring section 52C via a fourth fold section 54D and both are in pressed engagement along a fourth axial interface 56D. Finally, fifth ring section 52E is coupled to fourth ring section 52D via a fifth fold section 54E and both are in pressed engagement along a fifth axial interface 56E. As seen, first fold section 54A, third fold section 54C and fifth fold section 54E define "inner" fold sections that are aligned along a first or inner face surface 60 of inertia ring 14. Likewise, second fold section 54B and fourth fold section 54D define "outer" fold sections that are aligned along a second or outer face surface 62 of inertia ring 14. While each of the axially-extending annular interfaces 56A, 56B, 56C, 56D and 56E are disclosed to include engagement between adjacent fold sections, it will be understood that such pressed engagement is not necessary to the function of inertia ring 14 and that open or spaced interfaces between adjacent fold sections can be formed if desired.

Following the plurality of cold forming operations required to manufacture the folded configuration of inertia ring 14, it may be necessary to machine first face surface 60 and second face surface 62 to establish the desired first width dimension $W_1$. An edge surface 64 of flange section 34 may also be machined to establish the desired second width dimension $W_2$. In addition, an inner surface 66 of fifth ring section 52E can be machined to establish the desired inner diameter $D_1$, for inertia ring 14. Likewise, outer surface 36 of flange section 34 can be machined to establish the desired outer diameter $D_2$. Based on the specific mass and size requirements for different inertia rings, the number and lengths of the folded ring sections can be revised.

With continued reference primarily to FIG. 6, a first void 58A is defined in conjunction with first interface 56A between flange section 34 and first ring section 52A. A second void 58B is defined in conjunction with second interface 56B between first fold section 54A and third fold section 54C. A third void 58C is defined in conjunction with third interface 56C between second fold section 54B and fourth fold section 54D. A fourth void 58D is defined in conjunction with fourth interface 56D between third fold section 54C and fifth fold section 54E. Finally, a fifth void 58E is defined in conjunction with fifth interface 56E between forth fold section 54D and fifth ring section 52E. These voids are circular in shape and are generally concentric to a centerline 68 of inertia ring 14. The annular voids will be generally v-shaped based on the arcuate edges of the fold sections as each transitions into its corresponding axial interface.

Figure 7:
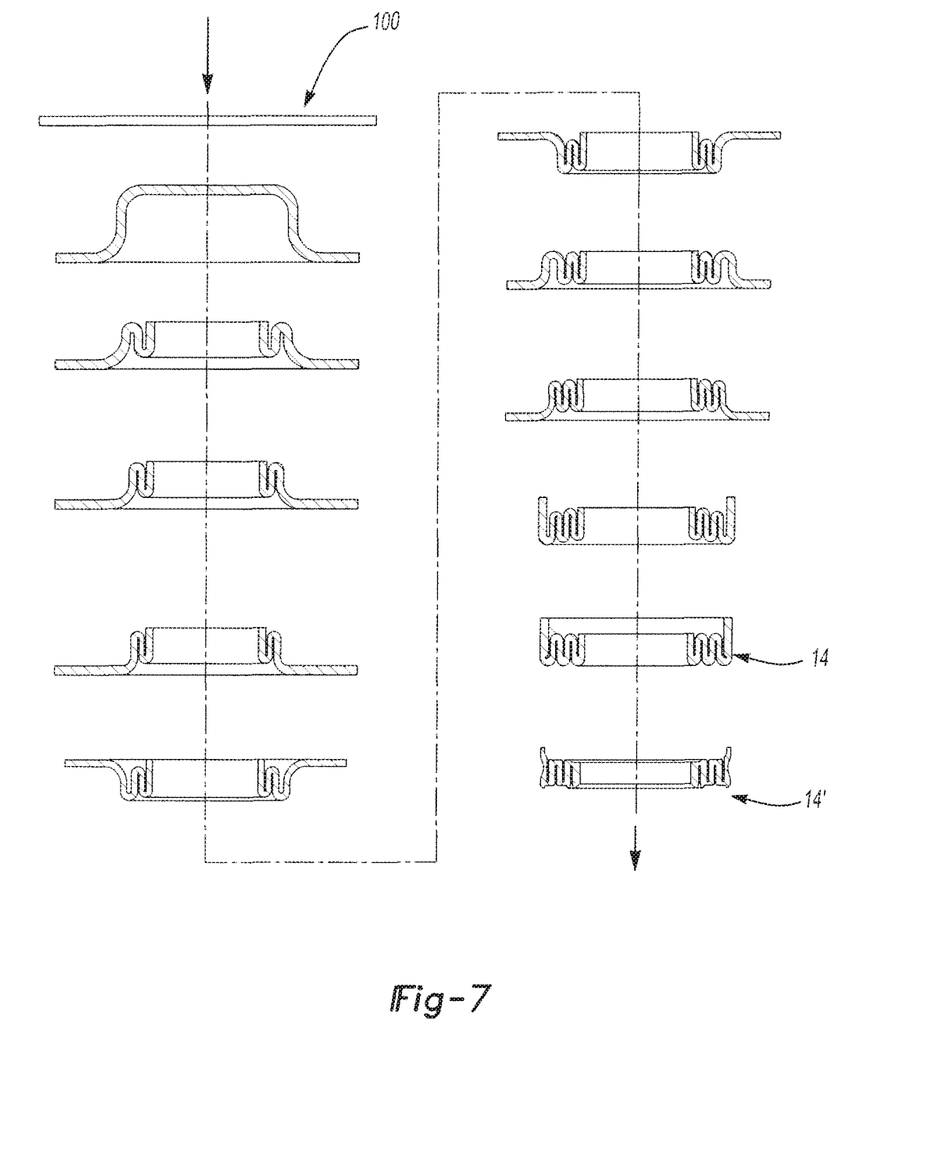
FIG. 7 is a flow chart for an exemplary sequence of processing steps utilized to cold form the inertia ring of FIG. 6 using a manufacturing process in accordance with the teachings of the present disclosure.
Figure 8:
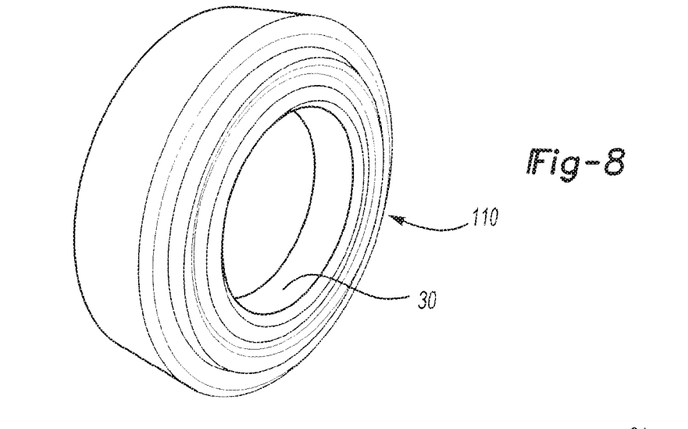
FIG. 8 is a perspective view of an accordion-type folded inertia ring after completion of the cold forming operations.
Figure 9:
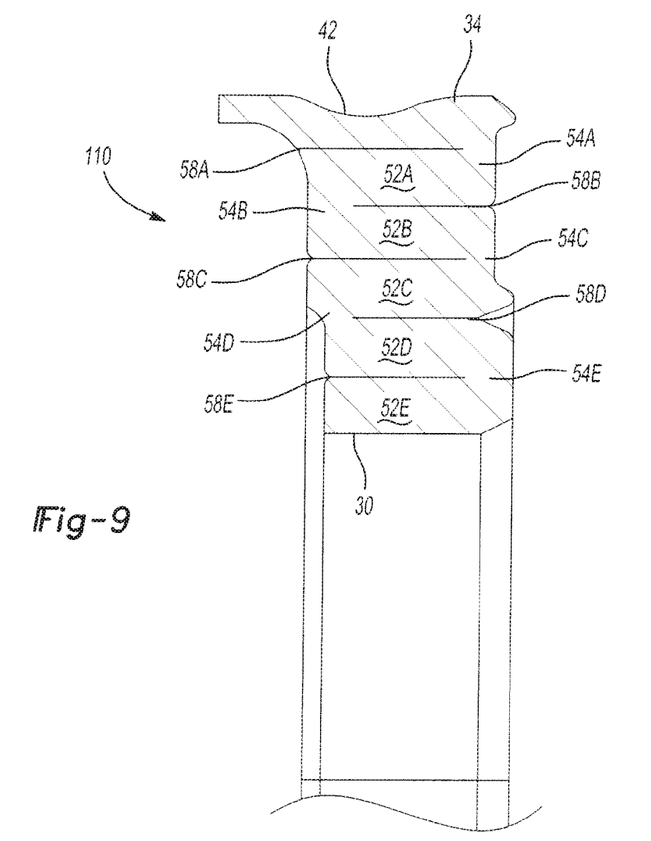
FIG. 9 is a partially sectioned perspective view of the inertia ring shown in FIG. 8 after final machining.

Referring now to FIG. 7, an exemplary process flow chart is provided illustrating a transfer sequence that can be used to manufacture "folded" inertial ring 14. The transfer process flow illustrates various forms of inertia ring 14 as it is fabricated from blank 100 into inertia ring 14. Not all forming sequences are shown, but only those necessary to properly illustrate the series of folding and pressing process steps associated with the present disclosure. Reference number 14' identifies inertia ring 14 after it has optionally been machined. FIGS. 8 and 9 are perspective views of another inertia ring 110 manufactured according to the present invention. The flow chart of FIG. 7 is intended to merely show the configuration of inertia ring 14 at different cold forming operations.

While the present disclosure is generally directed to inertia rings of the type used in harmonic dampers for vehicular applications, it will be appreciated that multi-folded ring components manufactured using the cold forming process of the present disclosure can be used in a plethora of other automotive and non-automotive applications. To this end, the present disclosure may be interpreted to include and encompass ring components having a folded one-piece structure that are manufactured utilizing the cold forming process of the present disclosure.

The foregoing description of the exemplary embodiments has been provided for purposes of illustration and description relating to an inertia ring and a method of making the inertia ring. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A harmonic damper unit, comprising:
   a pulley;
   an inertia ring; and
   a damper ring disposed between the pulley and the inertia ring,
   wherein the inertia ring includes a multi-fold body portion having a plurality of interconnected ring sections.

2. The harmonic damper unit of claim 1 wherein the inertia ring is cold formed from a metal blank to create the plurality of interconnected ring sections.

3. The harmonic damper unit of claim 2 wherein the multi-fold body portion of the inertia ring terminates in an outer flange section, wherein the pulley includes annular rim section, and wherein the damper ring is disposed between and in engagement with the flange section of the inertia ring and the rim section of the pulley.

4. The harmonic damper unit of claim 3 wherein the multi-fold body portion of the inertia ring further defines an inner flange section configured to surround a hub section of the pulley.

5. The harmonic damper unit of claim 4 wherein the hub section of the pulley is adapted to be connected to a crankshaft of an internal combustion engine, and wherein the rim section of the pulley is adapted to engage a drive belt of an accessory drive system for transferring rotary power from the crankshaft to a remote accessory associated with the accessory drive system.

6. The harmonic damper unit of claim 2 wherein the metal blank is cold formed through a series of sequential metal forming operations to establish the multi-fold body portion of the inertia ring, and wherein each of the ring sections is interconnected via a fold section.

7. The harmonic damper unit of claim 1 wherein the multi-fold body portion of the inertia ring defines an inner flange section and an outer flange section, wherein the multi-fold body portion is ring-shaped with the inner flange defining a central aperture.

8. The harmonic damper unit of claim 7 wherein the plurality of interconnected ring sections includes a first ring section connected to the outer flange section by a first fold section to define a first axial interface therebetween, and a second ring section connected to the first ring section by a second fold section to define a second axial interface therebetween, and wherein the first ring section is radially disposed between the flange section and the second ring section such that the first axial interface concentrically surrounds the second axial interface.

9. The harmonic damper unit of claim 8 wherein the plurality of interconnected ring sections further includes a third ring section connected to the second ring section by a third fold section to define a third axial interface therebetween, and a fourth ring section connected to the third ring section by a fourth fold section to define a fourth axial interface therebetween, wherein the third ring section is radially disposed between the second ring section and the fourth ring section such that the second axial interface concentrically surrounds the third axial interface and the third axial interface concentrically surrounds the fourth axial interface, wherein the fourth ring section is connected to the inner flange section by a fifth fold section to define a fifth axial interface therebetween, wherein the fourth ring section is radially disposed between the third ring section and the inner flange section such that the fourth axial interface concentrically surrounds the fifth axial interface, and wherein the first, third and fifth fold sections extend along a first face surface of the mass body portion and the second and fourth fold sections extend along a second face surface of the mass body portion.

10. An inertia ring adapted for use in a harmonic damper having a pulley and an elastomeric ring connecting the inertia ring to the pulley, the inertia ring including a mass body portion formed from a plurality of ring sections interconnected by a plurality of fold sections to define a one-piece folded structure.

11. The inertia ring of claim 10 wherein the mass body portion is cold formed from a metal blank to create the interconnected ring sections and fold sections.

12. The inertia ring of claim 11 wherein the metal blank is made from low carbon sheet steel.

13. The inertia ring of claim 11 wherein the mass body portion terminates in an outer flange section configured to be surrounded by the elastomeric ring, and wherein the mass body portion defines a central aperture configured to surround a hub segment of the pulley.

14. The inertia ring of claim 11 wherein the metal blank is cold formed through a series of sequential metal forming operations to establish the multi-fold body portion of the inertia ring, and wherein each of the ring sections is interconnected via a fold section.

15. The inertia ring of claim 10 wherein the body portion of the inertia ring defines an inner flange section and an outer flange section, wherein the body portion is ring-shaped with the inner flange defining a central aperture.

16. The inertia ring of claim 15 wherein the plurality of interconnected ring sections includes a first ring section connected to the outer flange section by a first fold section to define a first axial interface therebetween, and a second ring section connected to the first ring section by a second fold section to define a second axial interface therebetween, and wherein the first ring section is radially disposed between the flange section and the second ring section such that the first axial interface concentrically surrounds the second axial interface.

17. The inertia ring of claim 16 wherein the plurality of interconnected ring sections further includes a third ring section connected to the second ring section by a third fold section to define a third axial interface therebetween, and a fourth ring section connected to the third ring section by a fourth fold section to define a fourth axial interface therebetween, wherein the third ring section is radially disposed between the second ring section and the fourth ring section such that the second axial interface concentrically surrounds the third axial interface and the third axial interface concentrically surrounds the fourth axial interface, wherein the fourth ring section is connected to the inner flange section by a fifth fold section to define a fifth axial interface therebetween, wherein the fourth ring section is radially disposed between the third ring section and the inner flange section such that the fourth axial interface concentrically surrounds the fifth axial interface, and wherein the first, third and fifth fold sections extend along a first face surface of the mass body portion and the second and fourth fold sections extend along a second face surface of the mass body portion.

18. An inertia ring adapted for use in a damper unit having a drive member and a resilient damper ring disposed between the drive member and the inertia ring, the inertia ring defining an outer flange section, an inner flange section, and a mass body section interconnecting the inner and outer flange sections, the mass body section formed from a plurality of folded and concentrically stacked ring sections.

19. The inertia ring of claim 18 wherein the mass body section is cold formed from a circular metal blank to create the ring sections which are interconnected via corresponding fold sections.

20. The inertia ring of claim 19 wherein the plurality of interconnect ring sections and fold sections include a first ring section connected to the outer flange section by a first fold section to define a first circumferential interface therebetween, a second ring section connected to the first ring section by a second fold section to define a second circumferential interface therebetween, and a third ring section connected to the inner flange section by a third fold section to define a third circumferential interface therebetween, wherein the first circumferential interface surrounds the second circumferential interface and the second circumferential interface surrounds the third circumferential interface, and wherein the third ring section is connected directly to second ring section via another fold section or via one or more additional ring sections and fold sections.

* * * * *